United States Patent Office 3,423,065
Patented Jan. 21, 1969

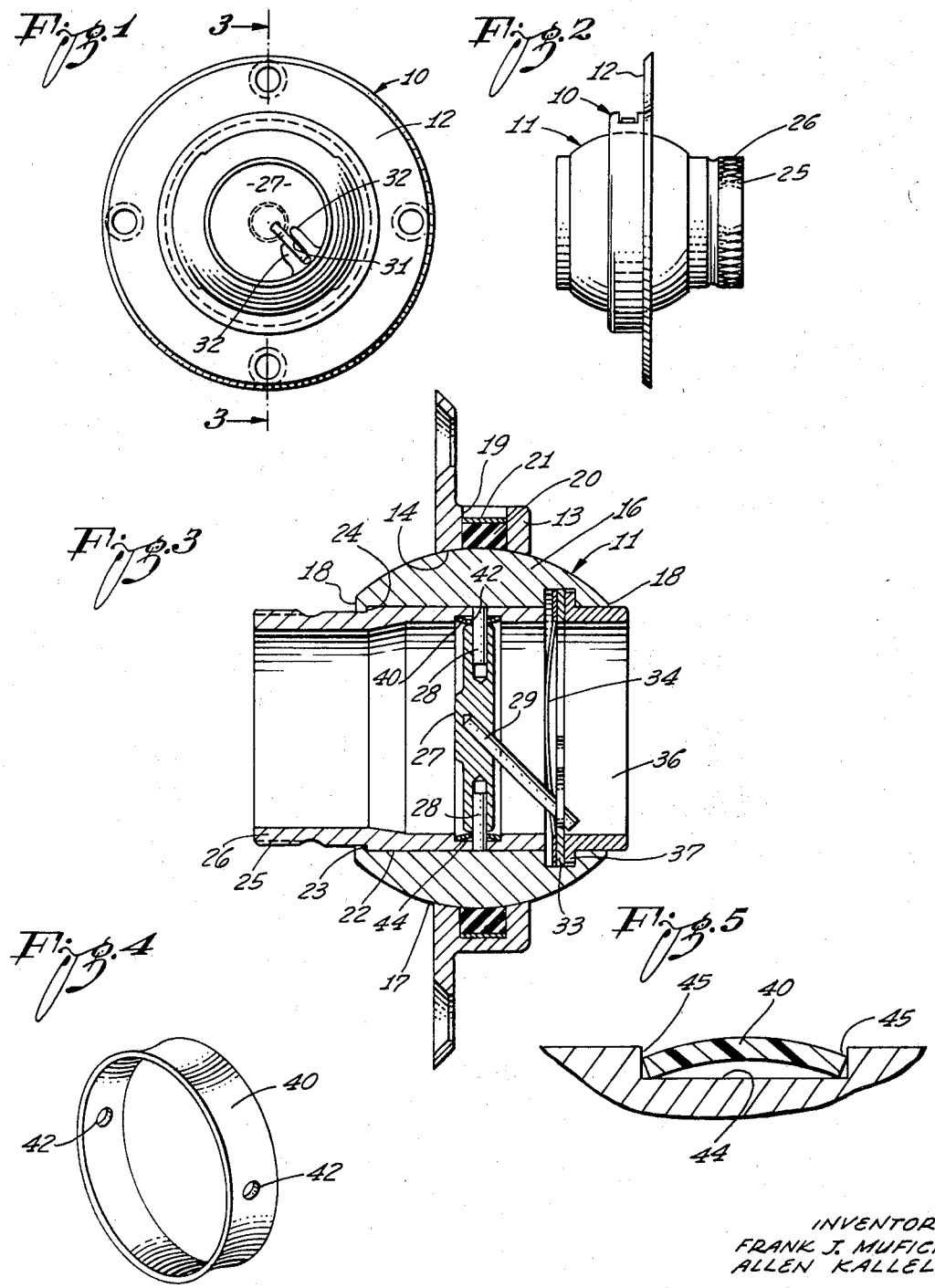

3,423,065
AIR VALVE
Allen Kallel and Frank J. Mufich, Los Angeles, Calif., assignors to Wemac Company, Inglewood, Calif., a corporation of California
Filed Feb. 28, 1966, Ser. No. 530,267
U.S. Cl. 251—306     4 Claims
Int. Cl. F16k 1/226

ABSTRACT OF THE DISCLOSURE

A seal for a butterfly valve member comprises a continuous thin-walled ring or narrow sleeve of resiliently deformable material mounted in an inner circumferential groove of the valve passage. The thin wall of the seal is arch shaped in cross-sectional configuration and bulges radially inwardly into yielding contact with the closed butterfly valve member, the opposite ends of the arch backing against the circumferential side walls of the groove.

---

This invention relates to a valve and, more particularly, relates to a butterfly-type valve of a construction having special utility for controllably admitting low pressure ventilation air to the region of an individual passenger on a public conveyance such as an airplane, train or bus.

For the purpose of illustration the invention is disclosed herein as directed specifically to a valve of the construction disclosed in the Ross Patent 2,596,869 wherein a butterfly valve member in the form of a disk is rotatable between a wide open position substantially parallel to the axis of the valve passage and a closed position at nearly 90° to the axis of the valve passage.

The present invention is directed to the problem of providing an effective seal around the butterfly valve member at its closed position. An effective seal is highly important not only because complete cessation of flow is desired at times but also because air leakage at the closed position of the valve creates an annoying hissing or whistling sound.

One difficulty in attempting to solve the sealing problem is that the valve is necessarily of light construction and the valve actuating mechanism is not capable of creating an operating force of substantial magnitude. Consequently any sealing means that creates substantial resistance to the closing action may prevent closing of the valve or may result in structural failure of the actuating mechanism. This difficulty has defeated all attempts to solve the problem by providing the periphery of the butterfly valve with a permanently attached sealing member.

Another difficulty arises from the fact that a limitation inherent in the particular valve actuating mechanism prevents rotating the butterfly valve disc completely to a position at 90° to the axis of the valve passage. This limitation is that the leverage afforded by the particular actuation mechanism falls off sharply at the 90° position. The requirement for preventing leakage then, is that the sealing means be effective when the butterfly disc itself is not in fully closed position. No attempt has been successful to solve this problem by sealing means mounted around the periphery of the butterfly valve disc.

The present invention solves the basic problem by providing sealing means fixed to the passage wall surrounding the butterfly valve disc, the sealing means comprising a resiliently flexible plastic member that bulges radially inwardly of the valve passage in a yielding manner to exert relatively light but effective sealing pressure against the outer circumference of the butterfly valve disc. In the preferred practice of the invention the plastic sealing means is a single circumferentially continuous ring.

A feature of the invention is that it is a simple matter to make such a sealing member wide enough to be effective at the partially closed position of the butterfly valve disc, the sealing indentation of the bulged plastic member readily conforming to the whole circumference of the slightly askew disc.

Fortuitously and inexpectedly, it has been found that the invention solves a further troublesome difficulty that is separate and apart from the sealing problem. This further difficulty is the tendency of the valve disc to cause rattling of the valve actuating mechanism in response to dynamic pressure against the valve disc at its open or partially open positions. The resilient yielding pressure of the sealing means effectively preloads the valve disc against the rattling action even when the pressure of the sealing member is restricted to the diametrically opposite pivot regions of the disc at the open or partially open positions of the disc.

A special feature of the preferred embodiment of the invention is the conception of releasably mounting the sealing member in the valve passage in a manner that greatly simplifies the fabrication of the valve and also simplifies replacing one sealing member with another in the event such replacement becomes desirable. The inside of the valve passage is formed with a shallow circumferential groove of appropriate width and the resilient sealing member is dimensioned to snap into its installed position. At its installed position the valve member in cross section forms an arch with the opposite ends of the arch anchored by abutment against the opposed shoulders formed by the opposite side walls of the groove.

The features and advantages of the invention may be understood from the following detailed description of the invention and the accompanying drawing.

In the drawing, which is to be regarded as merely illustrative:

FIG. 1 is a rear elevational view of the valve;

FIG. 2 is a side elevational view of the valve;

FIG. 3 is an enlarged sectional view along the line 3—3 of FIG. 1;

FIG. 4 is a perspective view of the sealing member; and

FIG. 5 is an enlarged radial cross section of the sealing member and the inner circumferential groove in which the valve member is sealed.

Before describing the particular improvement that constitutes the present invention, the structure disclosed in the above mentioned Ross patent will be described in detail. Referring now to FIGS. 1–3 of the drawing, the valve structure comprises a one-piece mounting bracket 10 and a valvular unit 11 mounted therein for universal movement to control the direction of air admitted through the valve into the vehicle with which it is used.

The mounting bracket 10 consists of a cylindrical plate 12 of some suitable metal having a centrally located circular opening therein. A hollow boss or collar 13 circumscribes the defining edge of the opening and extends substantially normal to the one face of the mounting plate 12. The inner surface 14 of the boss or collar has a spherical contour, that is, the inner surface defines a surface of a zone of a sphere. The inner surface of the boss or collar 13 at the one end thereof, and in diametrically opposed locations, is provided with arcuate kerfs or grooves 15. The grooves 15 permit the insertion into the mounting bracket of a valve body member 16 having the form of a hollow zone of a sphere of substantially the same radius as the spherical surface defined by the inner surface 14 of the boss or collar 13.

In assembling the valve body 16 with the mounting bracket 10, the body is inserted edgewise or in a transverse position into the opening of the bracket with the portions of the spherical surface 17 of the body which lie at the end of any major or transverse axis fitting into the kerfs or grooves 15. In this position, the truncated or end faces 18 of the valve body lie in parallelism with the minor axis of the boss or collar 13. The valve body is then urged inwardly until the center of curvature of the spherical surface 17 is coincident with the center of curvature of the spherical surface 14, after which the valve body is rotated until the truncated end faces 18 lie in parallelism with the planar portions of the mounting bracket 10. It should be seen now that the valve body 16 is mounted for universal movement relative to the mounting bracket 10.

To frictionally hold the valve body in a desired position of adjustment relative to the bracket, the spherical inner surface 14 of the latter is formed with an annular groove 19 receiving a spring-urged gasket assembly. The gasket member 20 of the assembly is preferably formed of a strip of fibrous material, such as felt disposed in the groove 19 and urged inwardly somewhat radially of the mounting bracket by one or more resilient metallic strips 21. The spring pressed felt gasket 20 not only frictionally holds the valve body against accidental movement relative to the mounting bracket, but also cooperates with the valve body to form an airtight seal between the same and the mounting bracket.

The valve body 16 is formed with a longitudinally disposed passage presenting a cylindrical wall surface 22. An inwardly directed annular flange 23 formed at the one end of the passage provides an annular shoulder against which seats an annular flange 24 of a tubular member 25 supported by the cylindrical wall surface 22 for rotation relative to the valve body. The tubular member projects outwardly from the one surface 18 of the cylindrical body member 16 and the projecting end portion is knurled as indicated at 26. This knurled projecting portion of the tubular member, as will later be seen, provides an actuator for not only varying the amount of air passing through the valve, but the direction of the air as well.

The tubular member 25 forms, as will be seen, a part of the throat or air passage of the valve and carries the butterfly element of the valve. This element comprises a disc 27 of substantially the same diameter as the inner diameter of the tubular member 25. The disc carries at diametrically opposite points outwardly projecting aligned pins 28 loosely received within openings formed in the tubular member 25. The disc thus is pivotally movable about an axis coincident with the longitudinal axis of the aligned pins 28 and this axis is, of course, coincident with a diameter of the disc. The disc 27, although it is pivotable about a major axis of the disc, also revolves with the tubular member as the latter is turned about its longitudinal axis.

To bring about rotation or tilting of the disc relative to the tubular member as the latter is rotated, the disc carries an operating member in the form of a fixed pin 29 angularly extending from the one face thereof. The pin 29 must be so carried by the disc that the longitudinal axis of the pin intersects the pivotal axis of the disc at the point where the minor axis of the disc intersects the pivotal axis. Thus, the pin is so fixed to the disc that a projection of the pin onto the disc extends radially of the same. The free end of the pin 29 is controlled by a suitable radial guide. In the particular construction shown, the pin 29 is received between a pair of closely spaced parallel members, the adjacent walls of which form a fixed guideway 31 which radially projects into the throat or air passage of the valve. The longitudinal axis of the guideway 31 is disposed in a plane containing the longitudinal axis of the tubular member and the intersection of the minor and major axes of the disc. Thus as the tubular member 25 is rotatably moved about its longitudinal axis, the disc as it is mounted to diametrically opposed points on the inner wall of the tubular member by the pins 28 will also revolve with the tubular member. As the pin 29, however, is held by the guideway 31 against movement except angular movement in the plane fixed by the guideway, the reaction forces created by the rotation of the disc with the tubular member tilts the disc about the axis of the pins 28. This is so, for rotation of the disc about its minor axis, when the disc is closing the tubular member, and is in a position in which its minor axis is coincident with the longitudinal axis of the tubular member 25, forces the free end of the pin 29 against the one wall of the fixed guideway 31.

This wall hereafter acts, as the disc continues to rotate with the tubular member, as a cam to apply to the follower formed by the free end of the pin 29 forces having a component normal to the pivotal axis established by the pins 28. This obviously will result in the disc 27 simultaneously tilting or rotating about its pivotal axis as it rotates with the tubular member to move the disc to its valve-open position.

With the disc in a position in which the minor or longitudinal axis thereof is normal to the longitudinal axis of the tubular member, that is, with the disc in its valve-open position, rotation of the tubular member in the opposite direction will force the free end of the pin against the opposite wall of the guideway and the resulting component, again normal to the pivotal axis of the disc but now oppositely directed, will, as the disc rotates with the tubular member, simultaneously tilt the disc in the opposite direction to a position in which it is closing the tubular member.

The various relationships that enter into the mode of operation for controlling the rotary position of the disc 27 may be seen in FIGS. 1 and 3. It will be noted that the pin 29 is aligned with the center of the disc 27 and is positioned at approximately 45° in three different respects, namely; first with respect to the longitudinal or minor axis of the disc 27 as may be seen in FIG. 4; second, with respect to the pivot axis of the disc defined by the two pins 28; and third, with respect to the plane or face of the disc 27. It will also be noted that the guideway 31 into which the pin extends is positioned radially of the passageway and at approximately 45° to the pivot axis of the disc 27 both when the disc is in the open position shown in FIG. 1 and in the closed position shown in FIG. 2.

The guideway 31 may be formed by laterally extending fingers 32 carried at the opposite ends of a resilient strip 33 coiled into a circular or annular form. The fingers 32, after the strip is formed into the circular shape, extend inwardly thereof to form the guideway. The pin 29 also acts to limit pivotal movement of the disc 27 as the tubular member 25 is rotated in either direction. The pin is so angularly carried by the disc and of such a length relative to the diameter of the passage that the free end of the pin moves into engagement with the wall of the passage intermediate the roots of the fingers 32 as the disc moves into its closing as well as its open position. Engagement of the pin with the wall of the passage obviously will prevent further movement of the disc in the direction which moved the pin into engagement with the wall.

In the assembly of the valve of the present invention, the tubular member 25 is inserted through the longitudinal passage of the valve body 16 until the annular flange thereon is brought into engagement with the shoulder of the valve body. A resilient washer 34 is now placed within the longitudinal passage of the valve body to contact the inner edge face of the tubular member 25, after which the coiled resilient strip 32 is circumferentially compressed and inserted within the longitudinal passage.

In this operation care must be taken to insure that the free end of the pin 29 is properly engaged in the guideway 31 formed by the inwardly extending parallel fingers 32. After the strip 33 has been mounted within the longitudinal passage with the end of the pin 29 riding in the guideway 31, a snap ring 36 formed with an outturned annular flange 37 is radially compressed and inserted into the longitudinal passage to bring the flange 37 into alignment with a groove formed in the wall of the passage of the valve body. The ring 36 is then released to permit the flange 37 to snap into the groove formed in the wall of the passage. This completes the assembly operation of the valve, for it will be seen that the assembled members are now held against longitudinal movement relative to the valve body 16.

Although both the resilient washer 34 and the coiled strip 33 tend to hold the tubular member 25 against accidental rotation which would, of course, pivotally move the disc 27, neither exerts sufficient force to prevent rotation of the tubular member when the knurled portion 26 is grasped by the user and turned to move the tubular member about its longitudinal axis.

The valve is mounted within the vehicle as shown in FIG. 2 by securing the mounting bracket or plate 12 to a bulkhead or wall element with the valve body projecting through an opening formed in the bulkhead. Air entering the leftward end of the valve body as viewed in FIG. 2, which is the entrance or inlet end of the valve, passes through the longitudinal passage if the disc has been moved to a position in which it is not fully closing the longitudinal passage, and then exits through the projecting ends of the tubular member into the interior of the vehicle.

To control the volume of air passing through the vehicle, it is only necessary, as above explained, to rotate the tubular member 25 to bring about the tilting or pivotal movement of the disc 27 about the pivotal axis established by the pin 28. With the disc 27 to its fully opened position, there is very little restriction to air flow through the valve as the thickness of the disc relative to the cross-sectional area of the tubular member 25 is relatively small. The velocity of the air flowing about the disc is therefore not greatly increased in velocity which might otherwise produce objectionable noises by varying velocities of the air moving through the valve. Furthemore the pressure drop across the valve of the present invention is relatively low so that a maximum volume of air will flow through the valve even though the pressure of the air at the entrance or inlet end of the valve is relatively low.

The knurled end 26 of the tubular member 25 forms a common actuator for not only varying the amount or volume of air discharged from the valve, but is also used as well to control the direction of the discharged air. This is so, for a user may merely grasp the knurled end of the tubular member and rotate the valve body 16 relative to the mounting bracket 12 to angularly adjust the valve body and thus direct the air discharge in any direction desired.

The structure described to this point is old in the art, the present invention being directed to the provision of the desired sealing means.

FIG. 4 shows in perspective a sealing ring or strips 40 which is the presently preferred embodiment of the sealing means. The sealing ring 40 is resiliently deformable and may be made of any suitable plastic including nylon and polytetrafluoroethylene, for example, but preferably is made of polyethylene. As may be seen in FIGS. 4 and 5, the sealing ring 40 is arcuate or dished in radial configuration. In this instance the sealing ring 40 is a resilient thin-walled plastic ring having the configuration generated by rotation of an arc about the axis of the valve passage with the radius of curvature of the arc positioned radially outwardly of the circular revolution. In other words, the strip or ring has the cross-sectional configuration of an arch with the opposite ends of the arch backed against the side walls of the groove 44. Since the sealing ring is to be located for cooperation with the valve disc 27, the sealing ring is formed with two diametrically opposite apertures 42 to clear the previously mentioned pivot pins 28.

The sealing ring 40 may be anchored in the valve passage in any suitable manner but a feature of this particular embodiment of the invention is the concept of mounting the sealing ring in an inner circumferential groove 44 formed in the wall of the valve passage, the groove being relatively shallow and relatively wide with two opposite side walls 45 as best shown in FIG. 5. An important advantage of mounting the sealing ring in this manner is that the groove 44 provides clearance for radially outward deformation of the sealing ring, the wall of the ring being merely flexed outward and not radially compressed.

In other words, the difference between the diameter of the bottom wall of the groove 44 and the outside diameter of the valve disk is greater than twice the thickness of the material of the wall of the sealing ring 40 to provide sufficient clearance between the valve disk and the bottom of the groove to avoid radial compression of the material of the sealing ring across its thickness. It is also to be noted that the thickness of the material of the wall of the strip is less than the depth of the groove and the width of the strip when flattened in cross section is greater than the width of the groove.

An important advantage of the construction is that it simplifies the installation of the sealing ring 40. To install a sealing ring it is merely necessary to force it into the valve passage and to permit it to snap into its installed position in the groove 44. As may be seen in FIG. 5 the installed sealing ring 40 has the cross-sectional configuration of an arch with the opposite ends of the arch in abutment with opposed shoulders formed by the opposite side walls 45 of the groove. It is to be noted that the sealing ring 40 bulges into the interior of the valve passage since at its unrestrained configuration shown in FIG. 5, the inside diameter of the sealing ring is less than the inside diameter of the valve passage and is less than the outside diameter of the valve disc. By virtue of these dimensional relationships, the sealing ring 40 is adapted for exerting yielding sealing pressure against the periphery of the valve disc.

It is important to note that the sealing ring 40 is wider than the thickness of the valve disc 27 to permit the sealing ring to make continuous contact around the periphery of the valve disc when the valve disc is slightly turned from a position at an angle of 90° to the axis of the valve passage. In other words, the greater width of the sealing ring makes it possible for the sealing ring to provide an effective seal even when the rotation of the valve disc to closed position stops at a slight angle from a closed position at 90° to the axis of the valve passage. Since the sealing ring lies in the region of the pivot axis of the valve disc it exerts radially inward pressure against the valve disc in diametrically opposite regions even when the valve disc is at its wide open position. It is this constant yielding pressure by the sealing ring that preloads the valve disc to eliminate rattling of the valve mechanism in response to air flow through the valve when the valve disc is in an open or partially open position.

Our description in specific detail of the selected embodiment of the invention will suggest various changes, substitutions and other departures from our disclosure within the spirit and scope of the appended claims.

We claim:
1. In a valve of the character described wherein a valve disc is pivotally mounted in a valve passage by diametrically opposite pivot means for rotation by actuating mechanism from a closed position at least approximately 90° relative to the axis of the passage to a maximum open position at least approximately parallel with said axis, the improvement to seal the passage at the closed position of the valve disc and to prevent rattling of the actuating mechanism at open positions of the valve disc, comprising:
   an inner circumferential groove in the valve passage intersected by the axis of said pivot means, said groove having opposite circumferential side walls; and sealing means in the form of a resiliently yieldable thin-walled strip seated in said groove, and retained in the groove only by the edges of the sealing means in contact with the circumferential side walls of the groove, and by the pivot means, said strip being of the shape of an arch in cross section with the arch bulging radially inwardly of the passage into yielding contact with the valve disc at the closed position of the disc and with the opposite ends of the arch backed against the side walls of the groove, the difference between the diameter of the bottom wall of the groove and the outside diameter of the valve disc being substantially more than twice the thickness of the material of the strip to prevent radial compression of the strip across the thickness of its material between the valve disk and the bottom of the groove.

2. An improvement as set forth in claim 1 in which said strip is cut away at diametrically opposite regions to clear said pivot means.

3. An improvement as set forth in claim 1 in which said strip is in the form of a circumferentially continuous sleeve with diametrical apertures to clear said pivot means.

4. In a valve of the character described wherein a valve disk is pivotally mounted in a valve passage by diametrically opposite pivot means for rotation by actuating mechanism from a closed position at least approximately 90° relative to the axis of the passage to a maximum open position at least approximately parallel with said axis, the improvement to seal the passage at the closed position of the valve disk and to prevent rattling of the actuating mechanism at open positions of the valve disk, comprising:

an inner circumferential groove intersected by the axis of said pivot means, said groove having opposite circumferential side walls; and sealing means in the form of a thin-walled resiliently yieldable strip seated in said groove, the width of the strip when the strip is flattened in cross-sectional configuration being greater than the width of the groove with the strip arching radially inwardly into yielding contact with the valve disk at the closed position of the valve disk, the thickness of the thin wall of the strip being less than the depth of the groove and the difference between the diameter of the bottom of the groove and the outside diameter of the valve disk being more than twice the thickness of the thin wall of the strip whereby the sealing action by the strip is accomplished without radial compression of the thin wall of the strip across the thickness of the thin wall against the bottom of the groove.

References Cited

UNITED STATES PATENTS

| 2,488,380 | 11/1949 | Danks | 251—173 |
| 2,596,869 | 5/1952 | Ross | 251—352 |
| 2,945,667 | 7/1960 | Bibbo et al. | 251—173 |
| 2,982,305 | 5/1961 | Grove | 251—173 X |

FOREIGN PATENTS 1,181,609   1/1959   France.

M. CARY NELSON, *Primary Examiner.*

ROBERT C. MILLER, *Assistant Examiner.*